United States Patent
Tan et al.

(10) Patent No.: US 10,719,141 B2
(45) Date of Patent: Jul. 21, 2020

(54) COMPUTER MOUSE

(71) Applicant: RAZER (ASIA-PACIFIC) PTE. LTD., Singapore (SG)

(72) Inventors: Min-Liang Tan, Singapore (SG); Sreenath Unnikrishnan, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 16/484,110

(22) PCT Filed: Feb. 10, 2017

(86) PCT No.: PCT/SG2017/050059
§ 371 (c)(1),
(2) Date: Aug. 6, 2019

(87) PCT Pub. No.: WO2018/147798
PCT Pub. Date: Aug. 16, 2018

(65) Prior Publication Data
US 2019/0391673 A1    Dec. 26, 2019

(51) Int. Cl.
G06F 3/033    (2013.01)
G06F 3/0354    (2013.01)
(Continued)

(52) U.S. Cl.
CPC .......... *G06F 3/03543* (2013.01); *B29C 66/71* (2013.01); *B29K 2027/18* (2013.01)

(58) Field of Classification Search
CPC .......... G06F 3/0354; G06F 3/033; G06F 3/02; G09G 5/08; G09G 5/00
See application file for complete search history.

(56) References Cited

U.S. PATENT DOCUMENTS 5,508,084 A * 4/1996 Reeves ............... B29C 37/0053
428/172
7,009,597 B1    3/2006 Ames
(Continued)

FOREIGN PATENT DOCUMENTS

CN    202826939 U    3/2013
CN    105843419 A    8/2016
(Continued)

OTHER PUBLICATIONS

International Search Report and Written Opinion, dated Nov. 8, 2017, for the corresponding International Application No. PCT/SG2017/050059 in 9 pages.
(Continued)

*Primary Examiner* — Pegeman Karimi
(74) *Attorney, Agent, or Firm* — Polsinelli PC (57) ABSTRACT

A mouse for communication with a processor-based device. The mouse may include a housing having a base surface. The base surface may be configured to face a tracking surface on which the mouse may be placed on. The mouse may further include a plurality of mouse foot protrusions projecting from the base surface. A distal end of at least one of the plurality of mouse foot protrusions may be configured to contact the tracking surface on which the mouse may be placed on and the distal end may include a first color. An intermediate portion of the at least one of the plurality of mouse foot protrusions between the distal end of the at least one of the plurality of mouse foot protrusions and the base surface may include a second color, which may be different from the first color.

13 Claims, 8 Drawing Sheets

(51) Int. Cl.
    *B29C 65/00*        (2006.01)
    *B29K 27/18*        (2006.01)

(56)            References Cited

U.S. PATENT DOCUMENTS 8,111,242 B1 *   2/2012  Charlton ............. G06F 3/03543
                                                          345/163
 2007/0069088 A1 *   3/2007  Bidiville ............ G06F 3/03543
                                                         248/188.9
 2009/0046062 A1 *   2/2009  Sayyadi ............. G06F 3/03543
                                                          345/158
 2010/0007531 A1 *   1/2010  Fluhrer ................ H03K 17/964
                                                           341/34
 2013/0021087 A1     1/2013  Rosset et al.
 2015/0234484 A1 *   8/2015  Winter ................ G06F 3/03543
                                                          345/163
 2017/0285848 A1 *  10/2017  Rosenberg ............. G06F 3/016

FOREIGN PATENT DOCUMENTS

CN           106183280 A      12/2016
    EP             2315104 A1      4/2011
    WO      WO 2006/118840 A1     11/2006
    WO      WO 2006/137028 A1     12/2006
    WO      WO 2016/116899 A1      7/2016

OTHER PUBLICATIONS

Extended European Search Report dated Nov. 11, 2019, 10 pages, for the corresponding European Patent Application No. 17895912.8.

* cited by examiner

COMPUTER MOUSE

TECHNICAL FIELD

Embodiments generally relate to a computer mouse.

BACKGROUND

A computer mouse available today uses polytetrafluoroethylene (PTFE) for its mouse feet. Compared to ceramic mouse feet that were used a few years ago, PTFE mouse feet are more cost effective and have a more balanced glide (between speed and control) for all uses. However, PTFE mouse feet are subjected to wear over time. The time taken to wear out the mouse feet varies greatly depending on the roughness of the mouse mat in use and the usage pattern of the user or the gamer.

Accordingly, with repeated mouse usage over a significant period of time, the mouse feet will wear down and can cause a noticeable decline in the mouse glide and performance. For instance, there will be a loss of glide performance of the mouse as the mouse feet wear down and the body of the mouse comes directly into contact with the mouse tracking surface, such as a mouse mat. Further, there will also be loss in tracking performance due to uneven wearing down of the plurality of mouse feet because the mouse will no longer be parallel to the mouse tracking surface.

SUMMARY

According to various embodiments, there is provided a mouse for communication with a processor-based device. The mouse may include a housing having a base surface. The base surface may be configured to face a tracking surface on which the mouse may be placed on. The mouse may further include a plurality of mouse foot protrusions projecting from the base surface. A distal end of at least one of the plurality of mouse foot protrusions may be configured to contact the tracking surface on which the mouse may be placed on and the distal end may include a first color. An intermediate portion of the at least one of the plurality of mouse foot protrusions between the distal end of the at least one of the plurality of mouse foot protrusions and the base surface may include a second color, which may be different from the first color.

According to various embodiments, there is provided a mouse foot replacement set for a mouse. The mouse foot replacement set may include a sheet of release liner and a mouse foot protrusion on the sheet of release liner. A distal end of the mouse foot protrusion may include a first color, and an intermediate portion of the mouse foot protrusion between the distal end of the mouse foot protrusion and the sheet of release liner may include a second color, which may be different from the first color.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DETAILED DESCRIPTION

Embodiments described below in context of the apparatus are analogously valid for the respective methods, and vice versa. Furthermore, it will be understood that the embodiments described below may be combined, for example, a part of one embodiment may be combined with a part of another embodiment.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

As described earlier, with repeated mouse usage over a significant period of time, the mouse feet will wear down and can cause a noticeable decline in the mouse glide and performance. While replacement mouse feet can be bought to fix these issues, the user or the gamer is unable to tell how much the feet have worn, how much longer they can last, and whether to change the mouse feet at that point in time. There is currently no way to determine the amount of wear the mouse feet have endured.

Various embodiments of a computer mouse have been provided to address at least some of the issues identified earlier.

Various embodiments provide a mouse for communication with a processor-based device, such as a computer mouse, that may allow the user or the gamer to know if and by how much their mouse feet are deteriorating with use.

Various embodiments provide a mouse for communication with a processor-based device, such as a computer mouse, that may indicate to the user or the gamer that it is time to replace the mouse feet or the mouse before there is a significant drop in the mouse performance.

Various embodiments provide a mouse for communication with a processor-based device, such as a computer mouse, that may be implemented with a visual indicator for mouse feet wear, so the user or the gamer may pre-emptively replace the mouse feet. The visual indicator may become visible only after a minimum wear has occurred on the respective mouse foot. In other words, the visual indicator may become visible after some material of the respective mouse foot has been removed. Alternatively, the visual indicator may be visible from the beginning and the indication may be implemented by a change of the initial structure of the visual indicator due to the removal of some material due to wear. The visual indicator may generally be formed by any desired, e.g. color, pattern, which may be released (in other words made become visible by material removal) or already visible from the beginning of the product lifetime.

Various embodiments provide a mouse for communication with a processor-based device, such as a computer mouse, that may include mouse feet that change color to indicate mouse feet wear.

Figure 1A:
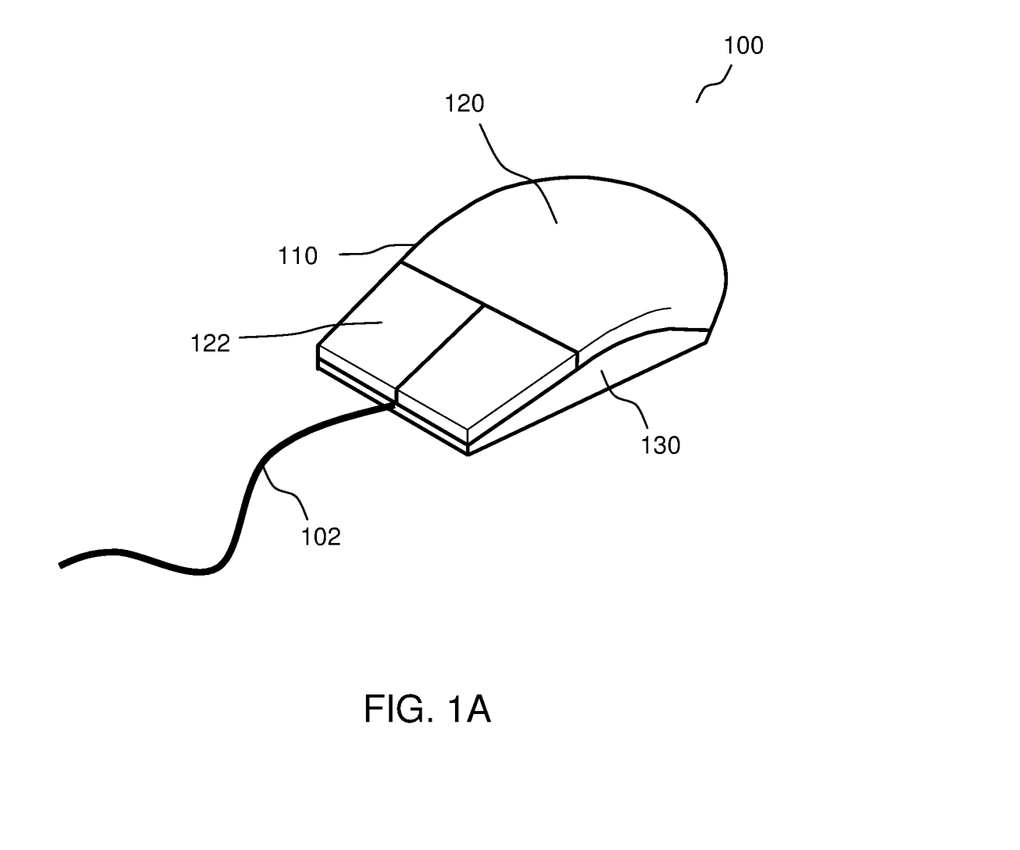
FIG. 1A shows an assembled view of a mouse for communication with a processor-based device according to various embodiments.
Figure 1B:
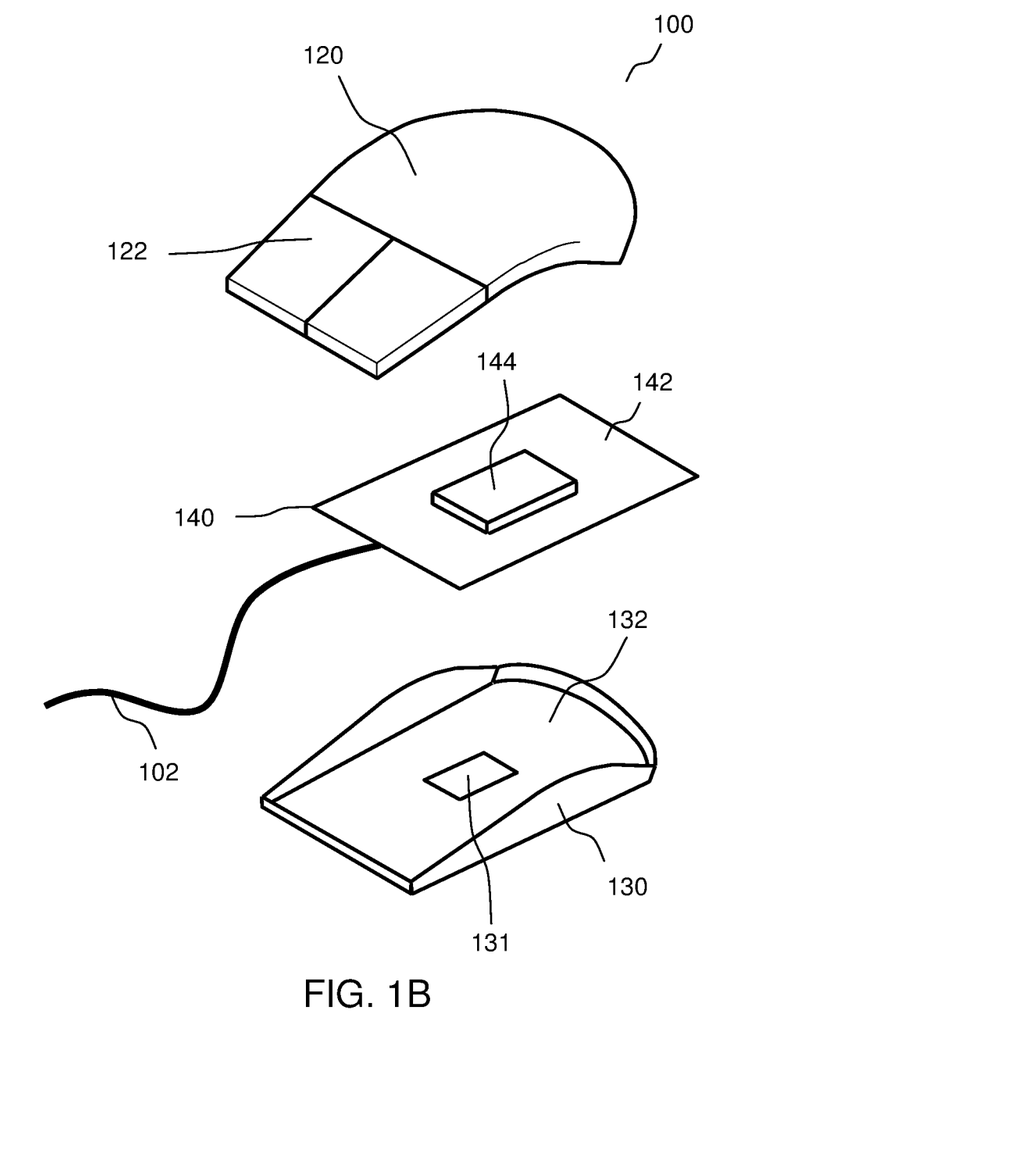
FIG. 1B shows an exploded view of the mouse of FIG. 1A according to various embodiments.

FIG. 1A shows an assembled view of a mouse 100 for communication with a processor-based device according to various embodiments. FIG. 1B shows an exploded view of the mouse 100 of FIG. 1A according to various embodiments. As shown, the mouse 100 may include a housing 110. The housing 110 may be an exterior casing of the mouse 100. Further, the housing 110 may include a cover portion 120 and a base portion 130. The cover portion 120 and the base portion 130 may be two separate parts of the housing 110. The cover portion 120 of the housing 110 may be a top case cover of the exterior casing of the mouse 100. The base portion 130 of the housing 110 may be a bottom case cover of the exterior casing of the mouse 100. According to various embodiments, when the cover portion 120 and the base portion 130 are assembled together, the housing 110 may define an inner cavity to house or encase internal components 140 of the mouse 100.

According to various embodiments, the internal components 140 of the mouse 100 may include an electronic circuit module 142 and a motion detection module 144. The electronic circuit module 142 may include printed circuit boards, or any other suitable electronic circuit. The electronic circuit module 142 may be connected to the processor-based device, such as a computer, via a cable 102. The motion detection module 144 may include optical sensors, or laser sensors, or track ball mechanism, or any other electronic or mechanical components that may be configured to detect movement of the mouse 100. The motion detection module 144 may further be configured to be in communication with the electronic circuit module 142 such that the detected movement of the mouse may be transmitted to the processor-based device, which the mouse 100 may be connected to.

Further, the cover portion 120 of the housing 110 may include one or more buttons 122. The one or more buttons 122 may be configured to interact with the electronic circuit module 142 of the mouse 100 for a user to provide inputs to the processor-based device, which the mouse 100 may be connected to, via clicking of the one or more buttons 122 of the mouse 100. The one or more buttons 122 may include a click button, or a scroll button, or a push button, or any combination of suitable buttons. The one or more buttons 122 may be located at any desired region of the cover portion 120 as desired.

According to various embodiments, the housing 110 may include a base surface 134. The base surface 134 may be configured to face a tracking surface on which the mouse 100 may be placed on. Accordingly, the base surface 134 of the housing 110 may be an exterior surface of a substantially flat section 132 of the base portion 130 of the housing 110. Thus, the mouse 100 may be placed with the base surface 134 of the base portion 130 of the housing 110 substantially flat against or substantially parallel to a mouse pad, a table top, or any other suitable tracking surfaces on which the mouse may be used.

According to various embodiments, the base portion 130 of the housing 110 may include a window 131. The window 131 may be an opening or a transparent portion of the base portion 130. Accordingly, the window 131 may allow the motion detection module 144 to detect relative movement between the mouse 100 and the tracking surface on which the mouse 100 may be placed and moved.

Figure 1C:
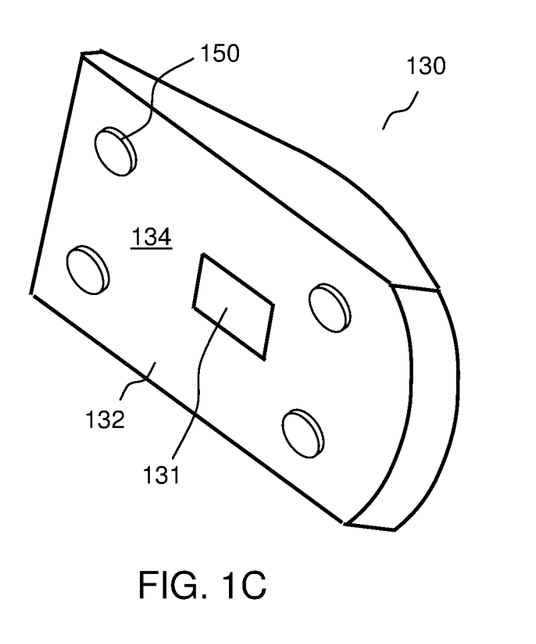
FIG. 1C shows a bottom perspective view of the base portion of the housing of the mouse of FIG. 1A according to various embodiments.
Figure 1D:
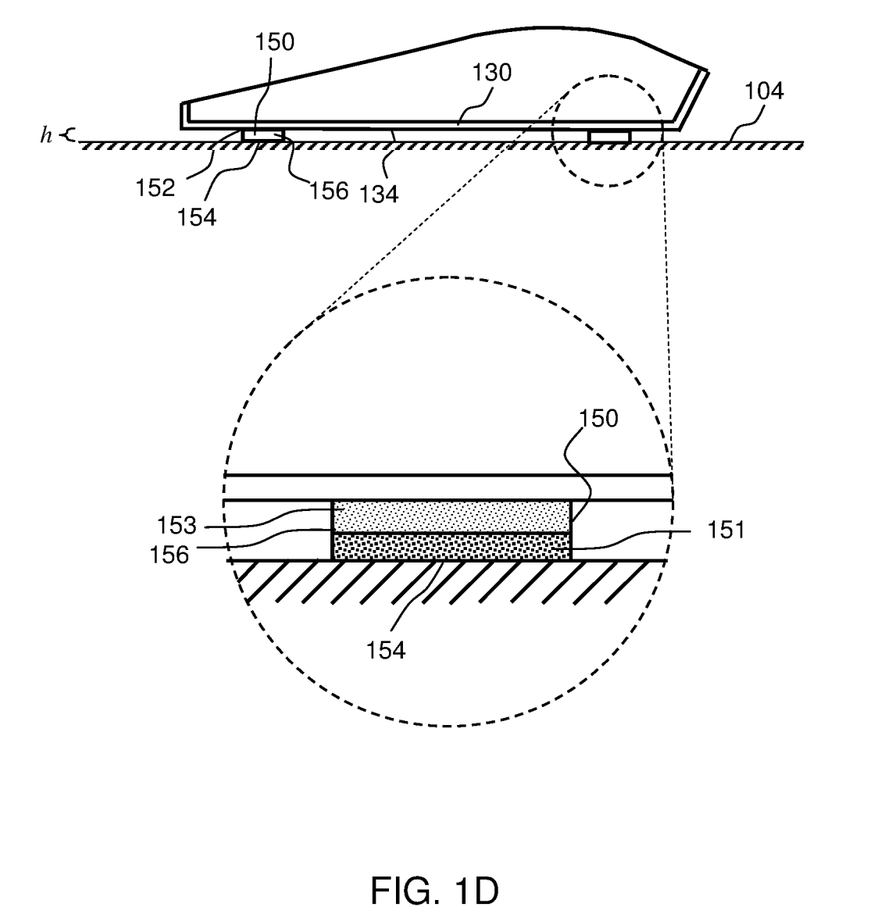
FIG. 1D shows a cross-sectional side view of the base portion of FIG. 1C with an enlarged view of a mouse foot protrusion according to various embodiments.

FIG. 1C shows a bottom perspective view of the base portion 130 of the housing 110 of the mouse 100 according to various embodiments. FIG. 1D shows a cross-sectional side view of the base portion 130 with an enlarged cross-sectional view of the mouse foot protrusion 150 according to various embodiments. As shown, the mouse 100 may include a plurality of mouse foot protrusions 150 projecting from the base surface 134 of the base portion 130 of the housing 110. According to various embodiments, the plurality of mouse foot protrusions 150 may be coupled or attached to the base surface 134 of the housing 110 via adhesive or any other suitable fastening means. According to various embodiments, the plurality of mouse foot protrusions 150 may be made of polytetrafluoroethylene.

As shown in FIG. 1C, the mouse 100 may include four mouse foot protrusions 150 projecting from the base surface 134. According to various embodiments, the mouse 100 may include two, or three, or four, or five, or six, or any number of mouse foot protrusions 150. Further, as shown in FIG. 1C, the plurality of mouse foot protrusions 150 may be circular in shape. According to various embodiments, the plurality of mouse foot protrusions 150 may be of a quadrilateral shape, or an oval shape, or an elliptical shape, or a crescent shape, or an annular shape, or any other suitable shapes.

As shown in FIG. 1C and FIG. 1D, the plurality of mouse foot protrusions 150 may be projecting away from the base surface 134 of the substantially flat section 132 of the base portion 130 of the housing 110 such that distal ends 154 of the plurality of mouse foot protrusions 150 may directly contact the tracking surface 104 on which the mouse 100 may be placed and moved. Accordingly, the plurality of mouse foot protrusions 150 may extend vertically downward from the base surface 134 of the substantially flat section 132 of the base portion 130 to support the mouse 100 on the tracking surface 104 which the mouse 100 may be placed and moved. Hence, the plurality of mouse feet protrusions 150 may hold and space the base surface 134 of the substantially flat section 132 of the base portion 130 a distance h vertically apart from the tracking surface 104 on which the mouse 100 may be placed and moved. Since the plurality of mouse foot protrusions 150 may touch or contact the surface on which the mouse 100 may be placed and moved, the plurality of mouse foot protrusions 150 may be configured to facilitate gliding or sliding of the mouse 100 over the tracking surface 104 on which the mouse 100 may be placed and moved to enhance the usability of the mouse 100 on said surface 104.

According to various embodiments, a distal end 154 of at least one of the plurality of mouse foot protrusions 150 may be configured to contact the tracking surface 104 on which the mouse 100 may be placed on. The distal end 154 of the at least one of the plurality of mouse foot protrusions 150 may be an end of the at least one of the plurality of mouse foot protrusions 150 that is furthest away from the base surface 134 of the base portion 130 of the housing 110.

According to various embodiments, the distal end 154 of the at least one of the plurality of mouse foot protrusions 150 may include a first color.

According to various embodiments, an intermediate portion 156 of the at least one of the plurality of mouse foot protrusions 150 between the distal end 154 of the at least one of the plurality of mouse foot protrusions 150 and the base surface 134 may include a second color. The intermediate portion 156 of the at least one of the plurality of mouse foot protrusions 150 may be a region of the at least one of the plurality of mouse foot protrusions 150 situated in an intermediary position within the at least one of the plurality of mouse foot protrusions 150. According to various embodiments, the second color may be different from the first color. According to various embodiments, the second color may be visually distinct from the first color.

Accordingly, when the at least one of the plurality of mouse foot protrusions 150 is brand-new, the first color may be seen at the distal end 154 of the at least one of the plurality of mouse foot protrusions 150. Through usage of the mouse 100, the distal end 154 of the at least one of the plurality of mouse foot protrusions 150 may wear down. As a result, a height of the at least one of the plurality of mouse foot protrusions 150 may be shorten due to the wear. When the at least one of the plurality of mouse foot protrusions 150 is shorten such that the distal end 154 reaches the intermediate portion 156 of the at least one of the plurality of mouse foot protrusions 150, the second color may be revealed or exposed at the distal end 154 of the at least one of the plurality of mouse foot protrusions 150 that is worn. According to various embodiments, the revealing of the second color at the distal end 154 of the at least one of the plurality of mouse foot protrusions 150 may be an indication that it is time to replace the at least one of the plurality of mouse foot protrusions 150 or an indication that there is a significant drop in the mouse performance.

According to various embodiments, the performance of the mouse 100 may be measured in terms of a glide of the mouse 100. The glide of the mouse 100 may be the smoothness or ease with which the mouse 100 may be moved over the tracking surface 104. Accordingly, when the at least one of the plurality of mouse foot protrusions 150 wears down, the glide of the mouse 100 may deteriorate or degrade such that moving the mouse 100 over the tracking surface 104 may not be as smooth and may be with increased resistance.

According to various embodiments, when the at least one of the plurality of mouse foot protrusions 150 is brand-new, the at least one of the plurality of mouse foot protrusions 150 may be configured, shaped, or profiled such that the glide of the mouse may be at an optimal. For example, the at least one of the plurality of mouse foot protrusions 150 may be configured, shaped, or profiled such that the distal end 154 of the at least one of the plurality of mouse foot protrusions 150 may be rounded or may include a smooth curved surface for contacting the tracking surface 104. Accordingly, a contact area between the rounded distal end 154 of the at least one of the plurality of mouse foot protrusions 150 and the tracking surface 104 may be at a minimal and the corresponding friction may also be at a minimal. Thus, the mouse 100 may have an optimal glide performance when the at least one of the plurality of mouse foot protrusions 150 is brand-new.

According to various embodiments, as the at least one of the plurality of mouse foot protrusions 150 wears down, some materials at the distal end 154 of the at least one of the plurality of mouse foot protrusions 150 may be abraded or eroded. For example, the rounded distal end 154 of the plurality of mouse foot protrusions 150 may be flatten and the contact area between the distal end 154 of the at least one of the plurality of mouse foot protrusions 150 and the tracking surface 104 may be increased causing a corresponding increase in the friction. The increase in friction may result in an increase in the resistance when moving the mouse 100 over the tracking surface 104. Thus, the mouse 100 may have a degraded glide performance due to the wear of the at least one of the plurality of mouse foot protrusions 150.

According to various embodiments, as the at least one of the plurality of mouse foot protrusions 150 continues to wear down, the at least one of the plurality of mouse foot protrusions may eventually wear out. When the at least one of the plurality of mouse foot protrusions 150 wears out, the base surface 134 of the mouse 100 may come into contact with the tracking surface 104, and may significantly increase the contact area between the mouse 100 and the tracking surface 104 causing a significant increase in the friction and resulting in a significant increase in the resistance when moving the mouse 100 across the tracking surface 104. Accordingly, wearing out of the at least one of the plurality of mouse foot protrusions 150 may cause a signification degradation in the glide of the mouse 100.

According to various embodiments, the at least one of the plurality of mouse foot protrusions 150 may be configured such that the distal end 154 of the at least one of the plurality of mouse foot protrusions 150 may show or exhibit the first color as long as the glide of the mouse 100 is within a pre-determined tolerance level. As the at least one of the plurality of mouse foot protrusions wears down, some materials at the distal end 154 of the at least one of the plurality of mouse foot protrusions 150 may be abraded or eroded. When the at least one of the plurality of mouse foot protrusions wears down to the intermediate portion 156, the second color may be revealed or exposed at the distal end of the at least one of the plurality of the mouse foot protrusions 150. According to various embodiments, the intermediate portion 156 of the at least one of the plurality of mouse foot protrusions 150 may be located at a position between the distal end 154 of the plurality of mouse foot protrusions 150 and the base surface 134 of the mouse 100 such that the second color may be revealed or exposed when the at least one of the plurality of mouse foot protrusions 150 has worn down to a stage that the glide of the mouse 100 has deteriorated beyond the pre-determined tolerance level. Accordingly, the revealing or exposing of the second color at the distal end 154 of the at least one of the plurality of mouse foot protrusions 150 may be an indication that the glide of the mouse may have degraded beyond the pre-determined tolerance level and a replacement of the at least one of the plurality of mouse foot protrusions 150 or the mouse 100 may be required.

According to various embodiments, the at least one of the plurality of mouse foot protrusions 150 may be configured such that the second color may be revealed or exposed when the at least one of the plurality of mouse foot protrusions 150 wears down to at least half of the original thickness of the brand-new mouse foot protrusion 150. Accordingly, the intermediate portion 156 having the second color may be between a midway of the at least one of the plurality of mouse foot protrusion 150 and the base surface 134 of the mouse 100. According to various embodiments, the at least one of the plurality of mouse foot protrusions 150 may be configured such that the second color may be revealed or exposed just before the at least one of the plurality of mouse foot protrusions 150 wears out. Accordingly, the intermediate portion 156 having the second color may be near a root of the at least one of the plurality of mouse foot protrusion 150 adjacent to the base surface 134 of the mouse 100.

According to various embodiments, the at least one of the plurality of mouse foot protrusions 150 may be configured such that a size of the second color revealed or exposed at the distal end 154 of the at least one of the plurality of mouse foot protrusions 150, as the at least one of the plurality of mouse foot protrusions wears down, may increase gradually depending on the degree of wear. For example, as more materials at the distal end 154 of the at least one of the plurality of mouse foot protrusions 150 are abraded or eroded, an area of a blotch of the second color at the distal end 154 of the at least one of the plurality of mouse foot protrusions 150 may increase. In this manner, the size of the second color at the distal end 154 of the at least one of the plurality of mouse foot protrusions 150 may indicate the state or conditions of the at least one of the plurality of mouse foot protrusions 150 such as the degree of wear of the at least one of the plurality of mouse foot protrusions 150. Accordingly, the size of the second color at the distal end 154 of the at least one of the plurality of mouse foot protrusions 150 may also serve as means to indicate how much the glide performance has degraded. According to various embodiments, the size of the second color revealed or exposed at the distal end 154 of the at least one of the plurality of mouse foot protrusions 150 may correspond to the size of the contact area between the at least one of the plurality of mouse foot protrusions 150 and the tracking surface 104.

According to various embodiments, the at least one of the plurality of mouse foot protrusions 150 may be configured such that a pattern of the second color revealed or exposed at the distal end 154 of the at least one of the plurality of mouse foot protrusions 150, as the at least one of the plurality of mouse foot protrusions wears down, may change depending on the degree of wear. For example, during the initial stages of wear of the at least one of the plurality of mouse foot protrusions 150, the second color revealed or exposed may be in the shape of a dot or a small circle. As more materials at the distal end 154 of the at least one of the plurality of mouse foot protrusions 150 are abraded or eroded, the shape of the second color revealed or exposed at the distal end 154 of the at least one of the plurality of mouse foot protrusions 150 may transition or evolve into a star shape, a hexagonal shape, a octagonal shape, an annular shape or any other suitable shapes. Accordingly, the shape of the second color at the distal end 154 of the at least one of the plurality of mouse foot protrusions 150 may indicate the state or conditions of the at least one of the plurality of mouse foot protrusions 150 such as the degree of wear of the at least one of the plurality of mouse foot protrusions 150. Thus, the shape of the second color at the distal end 154 of the at least one of the plurality of mouse foot protrusions 150 may also serve as means to indicate how much the glide performance has degraded.

According to various embodiments, the distal end 154 of the at least one of the plurality of mouse foot protrusions 150 may have the first color by having a first concentration of a material such that the first color may be a shade of the natural color of the material due to the first concentration of the material. Further, the intermediate portion 156 of the at least one of the plurality of mouse foot protrusions 150 may have the second color by having a second concentration of the material such that the second color may be another shade of the natural color of the material due to the second concentration of the material. According to various embodiments, the first concentration of the material may be higher than the second concentration of the material. Accordingly, the first color may be a darker shade of the natural color of the material and the second color may be a lighter shade of the natural color of the material.

According to various embodiments, the distal end 154 of the at least one of the plurality of mouse foot protrusions 150 may have the first color by having a first colorant, for example in the form of dye or pigment, such that the first color may be the color of the first colorant. Further, the intermediate portion 156 of the at least one of the plurality of mouse foot protrusions 150 may have the second color by having a second colorant, for example in the form of dye or pigment, such that the second color may be the color of the second colorant.

Referring to FIG. 1D, the at least one of the plurality of mouse foot protrusions 150 may include a first layer 151 and a second layer 153. As shown in FIG. 1D, the second layer 153 may be laid directly on the base surface 134 of the base portion 130 of the housing 110, and the first layer 151 may be laid or stacked directly on the second layer 153. Accordingly, the second layer 153 may be sandwiched between the base surface 134 of the housing 110 and the first layer 151. According to various embodiments, the second layer 153 and the first layer 151 may be shaped and arranged such that the two layers 151, 153 may be visible from a side of the at least one of the plurality of mouse foot protrusions 150 as shown in FIG. 1D.

Figure 2:
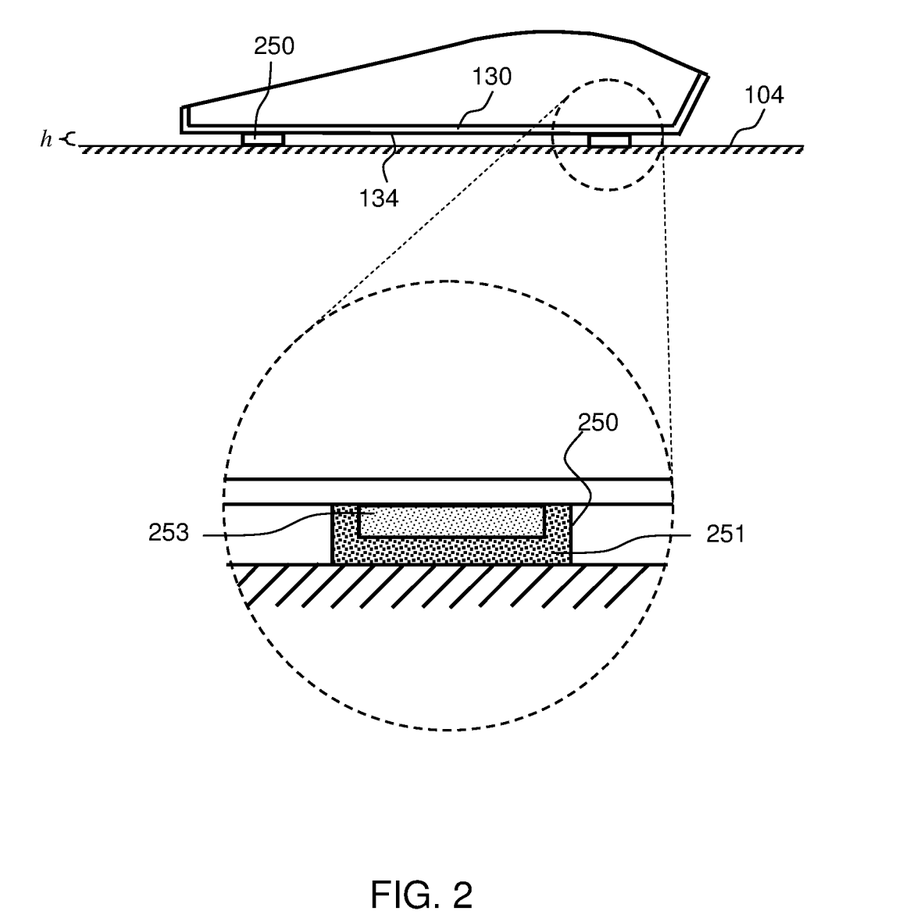
FIG. 2 shows a cross-sectional side view of a base portion with an enlarged view of a mouse foot protrusion according to various embodiments.

FIG. 2 shows a cross-sectional side view of the base portion 130 with an enlarged cross-sectional view of the mouse foot protrusion 250 according to various embodiments. As shown, the at least one of the plurality of mouse foot protrusions 250 may include a first layer 251 and a second layer 253. The second layer 253 may be laid directly on the base surface 134 of the base portion 130 of the housing 110, and the first layer 251 may be laid directly over the second layer 253 to cover the second layer 253. According to various embodiments, the second layer 253 and the first layer 251 may be shaped and arranged such that the first layer 251 may encapsulate the second layer 253, and the second layer 253 may not be visible when the at least one of the plurality of mouse foot protrusions is brand-new.

According to various embodiments, the first layer 151, 251 may have the first color and the second layer 153, 253 may have the second color.

According to various embodiments, the first layer 151, 251 and the second layer 153, 253 may be made of the same material, for example polytetrafluoroethylene. However, the first layer 151, 251 may be of the first color and the second layer 153, 253 may be of the second color, which is different from the first color. The difference in colour may be achieved via having different concentration of the same material in each of the first layer 151, 251 and the second layer 153, 253 such that each layer may exhibit a shade of the natural color of the material that is different from the other layer. The difference in colour may also be achieved via including different colorant, such as dye or pigment, in each of the first layer 151, 251 and the second layer 153, 253 such that each layer may exhibit a color that is different from the other layer.

According to various embodiments, the first layer 151, 251 may include a first material and the second layer 153, 253 may include a second material. Accordingly, the first material may have a color that is different from the color of the second material such that each layer may exhibit a color that is different from the other layer.

Figure 3:
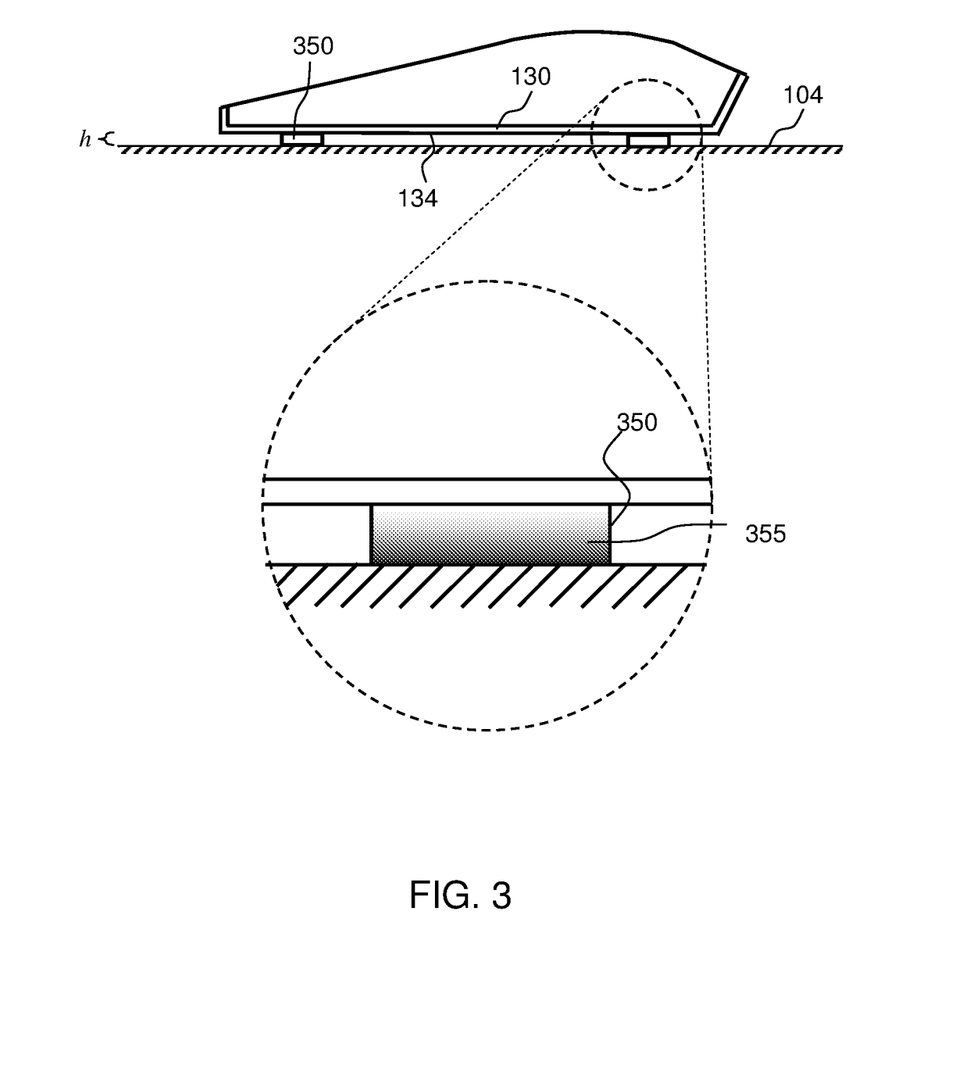
FIG. 3 shows a cross-sectional side view of a base portion with an enlarged view of a mouse foot protrusion according to various embodiments.

FIG. 3 shows a cross-sectional side view of the base portion 130 with an enlarged cross-sectional view of the mouse foot protrusion 350 according to various embodiments. As shown, the at least one of the plurality of mouse foot protrusions 350 may include a color gradient 355 along a direction at least substantially perpendicular to the base surface 134 of the base portion 130 of the housing 110. Accordingly, the at least one of the plurality of mouse foot protrusions 350 may progressively change color as the at least one of the plurality of mouse foot protrusions 350 wears down. Thus, the at least one of the plurality of mouse foot protrusions 350 may indicate the degree of wear. According to various embodiments, a color comparison template may be provided such that the user may compare the color of the at least one of the plurality of mouse foot protrusions 350 to determine the state of wear of the at least one of the plurality of mouse foot protrusions 350.

Figure 4A:
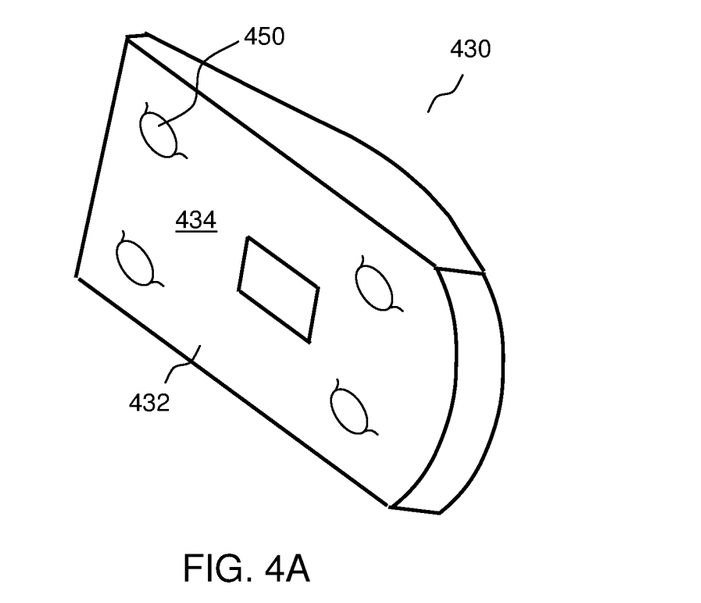
FIG. 4A shows a bottom perspective view of a base portion according to various embodiments.
Figure 4B:
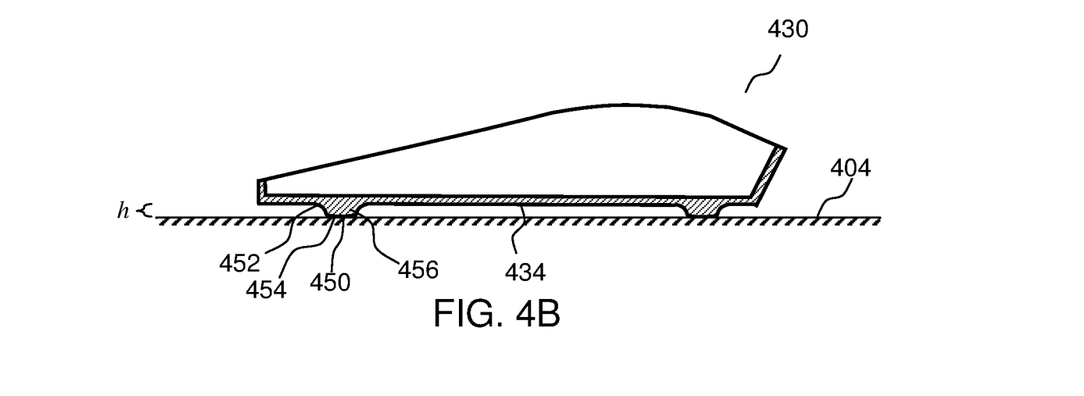
FIG. 4B shows a cross-sectional side view of the base portion of FIG. 4A according to various embodiments.

FIG. 4A shows a bottom perspective view of the base portion 430 of the housing 110 of the mouse 100 according to various embodiments. FIG. 4B shows a cross-sectional side view of the base portion 430 according to various embodiments. As shown, the base portion 430 of the housing 110 of the mouse 100 may include a plurality of mouse foot protrusions 450 integrally molded with the base portion 430 of the housing 110 and forming a portion of the base portion 430 of the housing 110. Accordingly, the base portion 430 of the housing 110 and the plurality of mouse foot protrusions 450 may be molded together as a single unitary component using a single mold such that the plurality of mouse foot protrusions 450 may be an integral part of the base portion 430 of the housing 110.

According to various embodiments, similar to the plurality of mouse foot protrusions 150, 250, 350 of FIG. 1C, FIG. 1D, FIG. 2 and FIG. 3, a distal end 454 of at least one of the plurality of mouse foot protrusions 450 may be configured to contact the tracking surface 404 on which the mouse 100 may be placed on. The distal end 454 of the at least one of the plurality of mouse foot protrusions 450 may be an end of the at least one of the plurality of mouse foot protrusions 450 that is furthest away from the base surface 434 of the base portion 430 of the housing 110. According to various embodiments, the distal end 454 of the at least one of the plurality of mouse foot protrusions 450 may include a first color.

According to various embodiments, similar to the plurality of mouse foot protrusions 150, 250, 350 of FIG. 1C, FIG. 1D, FIG. 2 and FIG. 3, an intermediate portion 456 of the at least one of the plurality of mouse foot protrusions 450 between the distal end 454 of the at least one of the plurality of mouse foot protrusions 450 and the base surface 434 may include a second color. The intermediate portion 456 of the at least one of the plurality of mouse foot protrusions 450 may be a region of the at least one of the plurality of mouse foot protrusions 450 situated in an intermediary position within the at least one of the plurality of mouse foot protrusions 450. According to various embodiments, the second color may be different from the first color. According to various embodiments, the second color may be visually distinct from the first color.

Accordingly, when the at least one of the plurality of mouse foot protrusions 450 is brand-new, the first color may be seen at the distal end 454 of the at least one of the plurality of mouse foot protrusions 450. Through usage of the mouse 400, the distal end 454 of the at least one of the plurality of mouse foot protrusions 450 may wear down. As a result, a height of the at least one of the plurality of mouse foot protrusions 450 may be shorten due to the wear. When the at least one of the plurality of mouse foot protrusions 450 is shorten such that the distal end 454 reaches the intermediate portion 456 of the at least one of the plurality of mouse foot protrusions 450, the second color may be revealed or exposed at the distal end 454 of the at least one of the plurality of mouse foot protrusions 450 that is worn. According to various embodiments, the revealing of the second color at the distal end 454 of the at least one of the plurality of mouse foot protrusions 450 may be an indication that it is time to replace the at least one of the plurality of mouse foot protrusions 450 or an indication that there is a significant drop in the mouse performance.

According to various embodiments, at least one of the plurality of mouse foot protrusions 450 of the base portion 430 of the housing 110 of the mouse 100 may include a curved cross-sectional profile. Accordingly, the at least one of the plurality of mouse foot protrusions 450 may be free of any sharp edges and may only have smooth curved edges. For example, as shown in FIG. 4A, the edge 452 at the transition between the exterior surface 434 of the base portion 430 and the at least one of the plurality of mouse foot protrusions 450 may be a smooth curved edge. Further, the distal end 454 of the at least one of the plurality of mouse foot protrusions 450 may also have a smooth curved edge rather than a sharp edge.

According to various embodiments, the at least one of the plurality of mouse foot protrusions 450 may include a rounded apex. Accordingly, the distal end 454 of the at least one of the plurality of mouse foot protrusions 450 may be a smooth curved surface.

Figure 5:
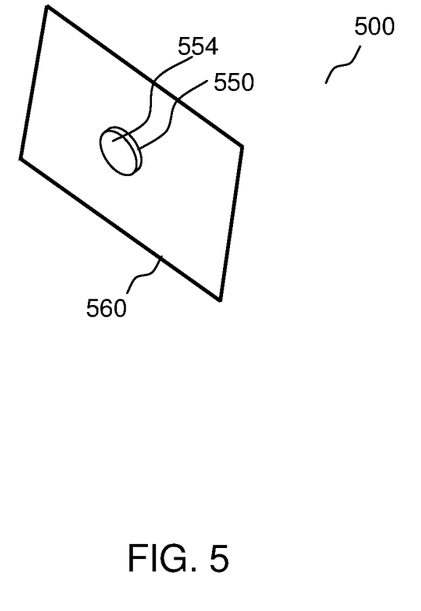
FIG. 5 shows a mouse foot replacement set according to various embodiments.

FIG. 5 shows a mouse foot replacement set 500 for a mouse according to various embodiments. As shown, the mouse foot replacement set 500 may include a sheet of release liner 560. The mouse foot replacement set 500 may further include a mouse foot protrusion 550 on the sheet of release liner 560. The mouse foot protrusion 550 may include an adhesive surface (not shown) and the adhesive surface may interface with the sheet of release liner 560.

As shown in FIG. 5, the sheet of release liner 560 may be larger than the mouse foot protrusion 550. According to various embodiments, the sheet of release liner 560 may be cut or configured to the shape and size of the adhesive surface of the mouse foot protrusion 550 such that the sheet of release liner may perfectly fit and cover the adhesive surface of the mouse foot protrusion 550. According to various embodiments, the mouse foot protrusion 550 may be made of polytetrafluoroethylene.

As shown in FIG. 5, the mouse foot replacement set 500 may include one mouse foot protrusion 550 attached to the release liner 560. According to various embodiments, the mouse foot replacement set 500 may include two, or three, or four, or five, or six, or any number of mouse foot protrusions 550 attached to the release liner 560. Further, as shown in FIG. 5, the mouse foot protrusion 550 may be circular in shape. According to various embodiments, the mouse foot protrusion 550 may be of a quadrilateral shape, or an oval shape, or an elliptical shape, or a crescent shape, or an annular shape, or any other suitable shapes.

According to various embodiments, the mouse foot protrusion 550 may be similar to the mouse foot protrusion 150, 250, 350 of FIG. 1C, FIG. 1D, FIG. 2 and FIG. 3. Accordingly, a distal end 554 of the mouse foot protrusion 550 may include a first color, and an intermediate portion of the mouse foot protrusion between the distal end 554 of the mouse foot protrusion 550 and the sheet of release liner 560 may include a second color. According to various embodiments, the second color may be different from the first color.

According to various embodiments, the second color may be visually distinct from the first color.

According to various embodiments, the distal end 554 of the mouse foot protrusion 550 may have the first color by having a first concentration of a material such that the first color may be a shade of the natural color of the material due to the first concentration of the material. Further, the intermediate portion of the mouse foot protrusions 550 may have the second color by having a second concentration of the material such that the second color may be another shade of the natural color of the material due to the second concentration of the material. According to various embodiments, the first concentration of the material may be higher than the second concentration of the material. Accordingly, the first color may be a darker shade of the natural color of the material and the second color may be a lighter shade of the natural color of the material.

According to various embodiments, the distal end 554 of the a mouse foot protrusion 550 may have the first color by having a first colorant, for example in the form of dye or pigment, such that the first color may be the color of the first colorant. Further, the intermediate portion of the at least one of the plurality of mouse foot protrusions 550 may have the second color by having a second colorant, for example in the form of dye or pigment, such that the second color may be the color of the second colorant.

According to various embodiments, the mouse foot protrusion 550 may include a first layer and a second layer. The second layer may be attached directly on the release liner 560, and the first layer may be laid or stacked directly on the second layer. Accordingly, the second layer may be sandwiched between the release liner and the first layer. According to various embodiments, the second layer and the first layer may be shaped and arranged such that the two layers may be visible from a side of the mouse foot protrusion 550.

According to various embodiments, the second layer may be attached to the release liner 560, and the first layer may be laid directly over the second layer to cover the second layer. Accordingly, the second layer and the first layer may be shaped and arranged such that the first layer may encapsulate the second layer, and the second layer may not be visible from a side of the mouse foot protrusion 550.

According to various embodiments, the first layer may have the first color and the second layer may have the second color.

According to various embodiments, the first layer and the second layer may be made of the same material, for example polytetrafluoroethylene. However, the first layer may be of the first color and the second layer may be of the second color, which may be different from the first color. The difference in colour may be achieved via having different concentration of the same material in each of the first layer and the second layer such that each layer may exhibit a shade of the natural color of the material that is different from the other layer. The difference in colour may also be achieved via including different colorant, such as dye or pigment, in each of the first layer and the second layer such that each layer may exhibit a color that is different from the other layer.

According to various embodiments, the first layer may include a first material and the second layer may include a second material. The first material may be a different material from the second material. Accordingly, the first material may have a color that is different from the color of the second material such that each layer may exhibit a color that is different from the other layer.

According to various embodiments, the mouse foot protrusion 550 may include a color gradient along a direction at least substantially perpendicular to the sheet of release liner 560. Accordingly, the mouse foot protrusion 550 may have a progressive color change along an axis of the mouse foot protrusion 550.

According to various embodiments, there is provided mouse feet that change color to indicate to the user that they are wearing out.

According to various embodiments, the mouse feet of the mouse may have two layers of polytetrafluoroethylene which are different in color. Once the bottom layer closer to the mouse mat surface wears out, the second layer may be exposed, which may serve as an indication for the user to purchase replacement mouse feet.

According to various embodiments, the mouse feet of the mouse may have two layers of two different materials which are of different colors. Similarly, once the bottom layer closer to the mouse mat surface wears out, the second layer may be exposed, which may serve as an indication for the user to purchase replacement mouse feet.

According to various embodiments, the mouse feet of the mouse may have a single layer polytetrafluoroethylene which may have a color gradient built in. As the mouse feet wear down, the color of the mouse feet progressively changes, indicating not just that they are wearing out, but degree of wear as well. The color of the mouse feet can then be compared to a template provided by the mouse manufacturer to give the user or the gamer exacting information about the state of their mouse feet and when to replace with new ones.

Various embodiments have provided a mouse foot of a mouse that may indicate to the user or gamer to replace the mouse foot or the mouse on time, before there is a significant drop in the performance of the mouse.

Various embodiments have provided a mouse foot of a mouse wherein quick wearing out of mouse foot may point to a mouse mat surface that may be overly rough or damaging, and the user or gamer may pre-emptively change mouse mat to avoid further damage if their mouse foot may indicate state of wear.

Various embodiments have provided a mouse foot of a mouse that may allow the user or the gamer to know if and by how much their mouse foot is deteriorating with use.

Various embodiments have provided a mouse foot of a mouse that may be able to indicate to the user or the gamer how much the mouse foot has worn and how much longer the mouse foot may last.

Various embodiments have provided a mouse that may be implemented with a visual indicator for mouse feet wear, so the user or the gamer may pre-emptively replace the mouse feet.

Various embodiments have provided a mouse foot of a mouse that may change color to indicate mouse feet wear.

While the invention has been particularly shown and described with reference to specific embodiments, it should be understood by those skilled in the art that various changes, modification, variation in form and detail may be made therein without departing from the scope of the invention as defined by the appended claims. The scope of the invention is thus indicated by the appended claims and all changes which come within the meaning and range of equivalency of the claims are therefore intended to be embraced.

The invention claimed is:

1. A mouse for communication with a processor-based device, the mouse comprising:

a housing having a base surface, wherein the base surface is configured to face a tracking surface on which the mouse is to be placed on; and a plurality of mouse foot protrusions projecting from the base surface, wherein a distal end of at least one of the plurality of mouse foot protrusions is configured to contact the tracking surface on which the mouse is to be placed on and the distal end comprises a first color, wherein an intermediate portion of the at least one of the plurality of mouse foot protrusions between the distal end of the at least one of the plurality of mouse foot protrusions and the base surface comprises a second color, which is different from the first color, and wherein the at least one of the plurality of mouse foot protrusions comprises a color gradient along a direction at least substantially perpendicular to the base surface extending from the distal end of the at least one of the plurality of mouse foot protrusions to the intermediate portion of the at least one of the plurality of mouse foot protrusions, wherein the color of the at least one of the plurality of mouse foot protrusions progressively changes along the color gradient from the first color at the distal end to the second color at the intermediate portion.

2. The mouse as claimed in claim 1, wherein the at least one of the plurality of mouse foot protrusions comprises a first layer and a second layer.

3. The mouse as claimed in claim 2, wherein the first layer comprises a first material and the second layer comprises a second material.

4. The mouse as claimed in claim 2, wherein the first layer comprises the first color and the second layer comprises the second color.

5. The mouse as claimed in claim 1, wherein the at least one of the plurality of mouse foot protrusions is integrally molded with the housing and forming a portion of the housing.

6. The mouse as claimed in claim 1, wherein the at least one of the plurality of mouse foot protrusions is attached to the base surface of the housing.

7. The mouse as claimed in claim 1, wherein the at least one of the plurality of mouse foot protrusions comprises polytetrafluoroethylene.

8. A mouse foot replacement set for a mouse, the set comprising:

a sheet of release liner; and a mouse foot protrusion on the sheet of release liner, wherein a distal end of the mouse foot protrusion comprises a first color, wherein an intermediate portion of the mouse foot protrusion between the distal end of the mouse foot protrusion and the sheet of release liner comprises a second color, which is different from the first color, and wherein the mouse foot protrusion comprises a color gradient along a direction at least substantially perpendicular to the sheet of release liner extending from the distal end of the at least one of the plurality of mouse foot protrusions to the intermediate portion of the at least one of the plurality of mouse foot protrusions, wherein the color of the mouse foot protrusion progressively changes along the color gradient from the first color at the distal end to the second color at the intermediate portion.

9. The set as claimed in claim 8, wherein the mouse foot protrusion comprises an adhesive surface, wherein the adhesive surface interfaces with the sheet of release liner.

10. The set as claimed in claim 8, wherein the mouse foot protrusion comprises a first layer and a second layer.

11. The set as claimed in claim 10, wherein the first layer comprises a first material and the second layer comprises a second material.

12. The set as claimed in claim 10, wherein the first layer comprises the first color and the second layer comprises the second color.

13. The set as claimed in claim 8, wherein the mouse foot protrusion comprises polytetrafluoroethylene.

* * * * *